US009753319B2

(12) United States Patent
Liu et al.

(10) Patent No.: US 9,753,319 B2
(45) Date of Patent: Sep. 5, 2017

(54) LIQUID CRYSTAL DISPLAY INCLUDING DISPLAY PANEL THAT INCLUDES WIRES AND PROTRUDING SPACERS

(71) Applicant: Xiaomi Inc., Beijing (CN)

(72) Inventors: Anyu Liu, Beijing (CN); Guosheng Li, Beijing (CN); Zhongsheng Jiang, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 14/968,028

(22) Filed: Dec. 14, 2015

(65) Prior Publication Data

US 2016/0320649 A1 Nov. 3, 2016

(30) Foreign Application Priority Data

Apr. 30, 2015 (CN) .......................... 2015 1 0213518

(51) Int. Cl.
*G06F 3/041* (2006.01)
*G02F 1/1333* (2006.01)
(Continued)

(52) U.S. Cl.
CPC ...... *G02F 1/13338* (2013.01); *G02F 1/13394* (2013.01); *G02F 1/134309* (2013.01);
(Continued)

(58) Field of Classification Search
USPC ................................................. 345/173–174
See application file for complete search history.

(56) References Cited

U.S. PATENT DOCUMENTS

2006/0109222 A1  5/2006  Lee et al.
2007/0097278 A1  5/2007  Rho et al.
(Continued)

FOREIGN PATENT DOCUMENTS

CN   1916739      2/2007
CN   101833188    9/2010
(Continued)

OTHER PUBLICATIONS

International Search Report of International Application No. PCT/CN2015/090561, mailed from the State Intellectual Property Office of China on Feb. 6, 2016 (5 pages).
(Continued)

*Primary Examiner* — Roy Rabindranath
(74) *Attorney, Agent, or Firm* — Finnegan, Henderson, Farabow, Garrett & Dunner LLP (57) ABSTRACT

A liquid crystal display (LCD) is provided. The LCD includes: a display panel and a touch panel, each electrically connected to a control unit, a top surface of the display panel being adhered to a bottom surface of the touch panel. The display panel includes: a lower substrate; an upper substrate disposed in parallel with the lower substrate; a liquid crystal layer and n wires enclosed in a cavity defined by the upper substrate and the lower substrate, each of the n wires including a first conductive terminal, a second conductive terminal, and a switch opening configured to connect the first conductive terminal and the second conductive terminal, n being a positive integer; and a plurality of protruding spacers disposed inside the cavity.

19 Claims, 10 Drawing Sheets

200c (51) Int. Cl.
  *G02F 1/1339* (2006.01)
  *G02F 1/1343* (2006.01)
  *G06F 3/047* (2006.01)
(52) U.S. Cl.
  CPC ............ *G06F 3/047* (2013.01); *G06F 3/0414* (2013.01); *G06F 2203/04105* (2013.01)

(56) References Cited

U.S. PATENT DOCUMENTS

| | | |
|---|---|---|
| 2007/0195029 A1 | 8/2007 | Jeon et al. |
| 2010/0013793 A1 | 1/2010 | Abileah et al. |
| 2010/0079381 A1 | 4/2010 | Hayashi et al. |
| 2010/0188346 A1* | 7/2010 | Yamauchi ............. G06F 3/0412 345/173 |
| 2010/0300862 A1 | 12/2010 | Tamura et al. |
| 2014/0210742 A1* | 7/2014 | Delattre ............. G06F 3/04883 345/173 |
| 2014/0247239 A1 | 9/2014 | Jamshidi-Roudbari et al. |
| 2015/0070305 A1 | 3/2015 | Seo et al. |

FOREIGN PATENT DOCUMENTS

| | | |
|---|---|---|
| CN | 103576960 | 2/2014 |
| JP | 2010-085812 | 4/2010 |
| JP | 2010-170356 | 8/2010 |
| JP | 2010-231783 | 10/2010 |

OTHER PUBLICATIONS

Extended European Search Report of European Application No. 15197321.1, dated Feb. 15, 2016 (6 pages).
Office Action from Patent Office of the Russian Federation for Russian Application No. 2016107765/28, dated Apr. 13, 2017, 13 pages.

* cited by examiner

LIQUID CRYSTAL DISPLAY INCLUDING DISPLAY PANEL THAT INCLUDES WIRES AND PROTRUDING SPACERS

CROSS-REFERENCE TO RELATED APPLICATION

The present application is based upon and claims priority to Chinese Patent Application No. 201510213518.8, filed Apr. 30, 2015, the entire contents of which are incorporated herein by reference.

TECHNICAL FIELD

The present disclosure generally relates to the technical field of displays and, more particularly, to a liquid crystal display (LCD).

BACKGROUND

With the development of LCD technology, LCDs have become increasingly versatile. For example, a LCD may be implemented to perform a measurement of an external pressure force applied to the LCD.

For example, a LCD may include a display panel, a touch panel, and a film containing a pressure sensor, each of which is electrically connected to a control unit, such as a control chip. A bottom surface of the film may be adhered to a top surface of the touch panel, and a bottom surface of the touch panel may be adhered to a top surface of the display panel. When a user operates the LCD, the film can acquire a pressure value operated on the LCD, and send it to the control unit. The touch panel may acquire an operation position of the user and send it to the control unit. The control unit processes the received pressure value and the operation position, and controls the display of the LCD according to the processed result.

SUMMARY

According to a first aspect of the present disclosure, there is provided a liquid crystal display (LCD), comprising: a display panel and a touch panel, each electrically connected to a control unit, a top surface of the display panel being adhered to a bottom surface of the touch panel. The display panel comprises: a lower substrate; an upper substrate disposed in parallel with the lower substrate; a liquid crystal layer and n wires enclosed in a cavity defined by the upper substrate and the lower substrate, each of the n wires including a first conductive terminal, a second conductive terminal, and a switch opening configured to connect the first conductive terminal and the second conductive terminal, n being a positive integer; and a plurality of protruding spacers disposed inside the cavity, the plurality of protruding spacers being coupled to at least one of a bottom surface of the upper substrate and a top surface of the lower substrate. The switch opening of each of the n wires is configured to face one of the plurality of spacers. The first conductive terminal and the second conductive terminal are electrically disconnected when a corresponding spacer is not pressed down, and the first conductive terminal and the second conductive terminal are electrically connected when the corresponding spacer is pressed down.

According to a second aspect of the present disclosure, there is provided a method for measuring an external pressure force at the LCD. The method comprises: when a press operation is performed on the LCD, acquiring one or more signals generated by one or more wires of the n wires when the first conductive terminal and the second conductive terminal of each of the one or more wires are electrically connected; identifying a total number of the signals; and determining a pressure value of the press operation based on the total number of the signals.

According to a third aspect of the present disclosure, there is provided a device, comprises: the LCD; a processor; and a memory configured to storing instructions executable by the processor. The processor is configured to: when a press operation is performed on the LCD, acquire one or more signals generated by one or more wires of the n wires when the first conductive terminal and second conductive terminal of each of the one or more wires are electrically connected; identify a total number of the signals; and determine a pressure value of the press operation based on the total number of the signals.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
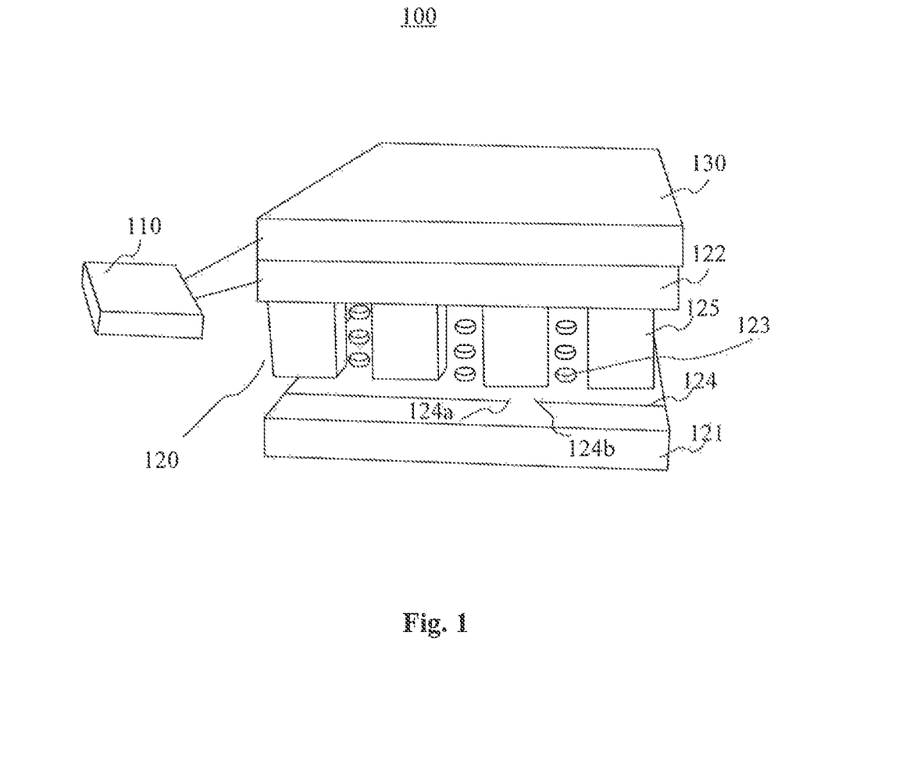
FIG. 1 is a schematic diagram of a LCD, according to an exemplary embodiment.

FIG. 1 is a schematic diagram of a LCD 100, according to an exemplary embodiment. Referring to FIG. 1, the LCD 100 includes a display panel 120 and a touch panel 130. The display panel 120 and the touch panel 130 are each electrically connected to a control unit 110. For example, the control unit 110 may be integrated chip or a processor. The control unit 110 may be implemented as an internal component inside the LCD 100 or as an external component connected to the LCD 100. In some embodiments, a top surface of the display panel 120 may be adhered to a bottom surface of the touch panel 130.

As shown in FIG. 1, the display panel 120 includes a lower substrate 121, an upper substrate 122 disposed in parallel with the lower substrate 121, a liquid crystal layer 123 and n (n being a positive integer) wires 124 enclosed in a cavity defined by the upper substrate 122 and the lower substrate 121, and an array of protruding spacers 125 disposed inside the cavity. The array of protruding spacers 125 is coupled to at least one of a bottom surface of the upper substrate 122 and atop surface of the lower substrate 121.

Each of the wires 124 inside the cavity includes a first conductive terminal 124a, a second conductive terminal 124b, and a switch opening which can be configured to connect the first conductive terminal 124a and the second conductive terminal 124b. For example, the first conductive terminal 124a and the second conductive terminal 124b may be located around a center portion of the wire. The switch opening may be configured to be facing one of the spacers 125.

In some embodiments, the first conductive terminal 124a and the second conductive terminal 124b are electrically disconnected when a corresponding spacer is not pressed down, and the first conductive terminal 124a and the second conductive terminal 124b are electrically connected when the corresponding spacer is pressed down. When a user triggers a press operation on the LCD, the spacers may be pressed down, and at this time, the first conductive terminals and the second conductive terminals of the wires facing the spacers may be electrically connected by the spacers. Correspondingly, the wires may in a conductive state. The external pressure value may be in proportion to a number of the wires that are in conductive states. Thus, the external pressure value may be determined based on a total number of the wires that are in the conductive state. In doing so, the LCD may avoid to include a film for measuring the external pressure force, thereby simplifying the structure of the LCD.

As shown in FIG. 1, in some embodiments, a top surface of the display panel 120 is adhered to a bottom surface of the touch panel 130. For example, the touch panel 130 may receive a press operation performed by a user on the touch panel 130, and send information about the press operation to the control unit 110. After it processes the information about the press operation, the control unit 110 causes the display panel 120 to display relevant contents.

In some implementations, the lower substrate 121 of the display panel 120 may be a Thin Film Transistor (TFT) substrate, and the upper substrate 122 of the display panel 120 may be a Color Filter (CT) substrate. In the present disclosure, the types of upper substrate 122 and lower substrate 121 are not intended to be limited.

In some embodiments, a cavity is formed between the lower substrate 121 and the upper substrate 122 to enclose the liquid crystal layer 123, and the array of spacers 125 is used to support the lower substrate 121 and the upper substrate 122 and form the cavity. In some implementations, the entire array of spacers 125 may be coupled to the top surface of the lower substrate 121, or be coupled to the bottom surface of the upper substrate 122. In other implementations, a portion of the array of spacers 125 may be coupled to the top surface of the lower substrate 121, and another portion of the array of spacers 125 may be coupled to the bottom surface of the upper substrate 122. For example, each of the spacers coupled to the top surface of the lower substrate 121 may be arranged to face one of the spacers coupled to the bottom surface of the upper substrate 122. As another example, the spacers coupled to the top surface of the lower substrate 121 may be arranged to be staggered to the spacers coupled to the bottom surface of the upper substrate 122. The arrangement of the spacers is not intended to be limited by the present disclosure.

The liquid crystal layer 123 is enclosed in the cavity. To ensure proper display, the distribution of the spacers in the array of spacers 125 may be configured in a way that the movement of the liquid crystals under the voltage is not affected.

In this disclosure, a switch opening refers to a switch formed by an opening between the first conductive n al 124a and the second conductive terminal 124b. Each of the wires 124 may include one switch opening, and the switch opening faces a corresponding spacer. When a switch opening faces a spacer, a projected line of the switch opening on the substrate is inside a projected plane of spacer on the same substrate, which is the opposite substrate of the substrate to which the spacer is coupled. For example, where the spacer is coupled to the top surface of the lower substrate 121, the projected line of the corresponding switch opening on the upper substrate 122 is inside the projected plane of the spacer on the upper substrate 122. Where the spacer is coupled to the bottom surface of the upper substrate 122, the projected line of the corresponding switch opening on the lower substrate 121 is inside the projected plane of the spacer on the substrate 121.

Figure 2A:
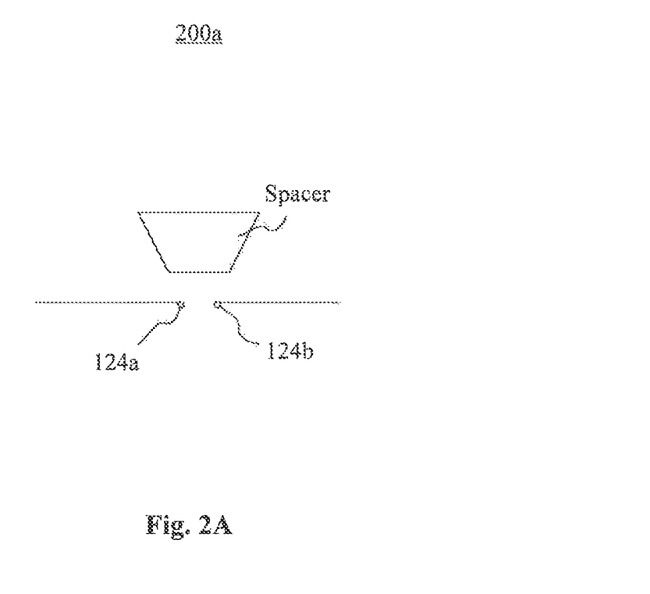
FIG. 2A is a schematic diagram illustrating positions of a wire and a spacer, according to an exemplary embodiment.

FIG. 2A is a schematic diagram 200a illustrating positions of a wire and a spacer, according to an exemplary embodiment. In this example, the spacer is coupled to the bottom surface of the upper substrate 122.

The top surface of the display panel 120 may be adhered to the bottom surface of the touch panel 130. When a press operation s performed on the touch panel 130, the upper substrate 122 of the display panel 120 may be pressed down, and spacers may be pressed down. The spacers may be made of conductive material or the bottom surfaces of the spacers may be coated with conductive material. When a spacer is pressed down, the first conductive terminal 124a and the second conductive terminal 124b of a corresponding may be closed such that the first conductive terminal 124a and the second conductive terminal 124b are electrically connected. At this time, the wire 124 forms a loop with the control unit 110, and sends a signal to the control unit 110. When a spacer is not pressed down, the first conductive terminal 124a and the second conductive terminal 124b of the corresponding wire is opened such that the first conductive terminal 124a and the second conductive terminal 124b are electrically disconnected. At this time, the wire 124 does not send a signal to the control unit 110.

In some embodiments, the n wires 124 inside the cavity may be evenly placed in the cavity such that the number of wires 124 in each unit of area is greater than a predetermined threshold. Accordingly, when a user performs a press operation at any position of the LCD 100, the pressure value of the press operation can be measured. The predetermined threshold may be an empirical value or a calculated value, which is not intended to be limited by the present disclosure.

In some implementations, the array of spacers 125 includes i rows of spacers, the n wires 124 may extend in a horizontal direction inside the cavity, and each of the n wires 124 is disposed below one of the i rows of spacers, where i is a positive integer and i≥n. The spacers over two adjacent wires 124 may be in adjacent rows or separated by a predetermined number of rows. For example, the row of spacers over the first wire may be separated from the row of spacers over the second wire by two rows, and the row of spacers over the second wire may be separated from the row of spacers over the third wire by another two rows. The predetermined number of rows may vary between various row of spacers. For example, the row of spacers over the first wire may be separated from the row of spacers over the second by two rows, and the row of spacers over the second wire 124 may be separated from the row of spacers over the third wire 124 by four rows. The setting of the predetermined number of rows is not intended to be limited by the present disclosure.

In some implementations, the n wires 124 include two or more groups of wires 124. The n wires 124 may each extend in a horizontal direction and be arranged in n rows. Within each group of wires 124, each switch opening may be staggered at a different position in the horizontal direction. The switch openings may be distributed evenly with an equal distance between the adjacent switch openings in the horizontal direction.

Figure 2B:
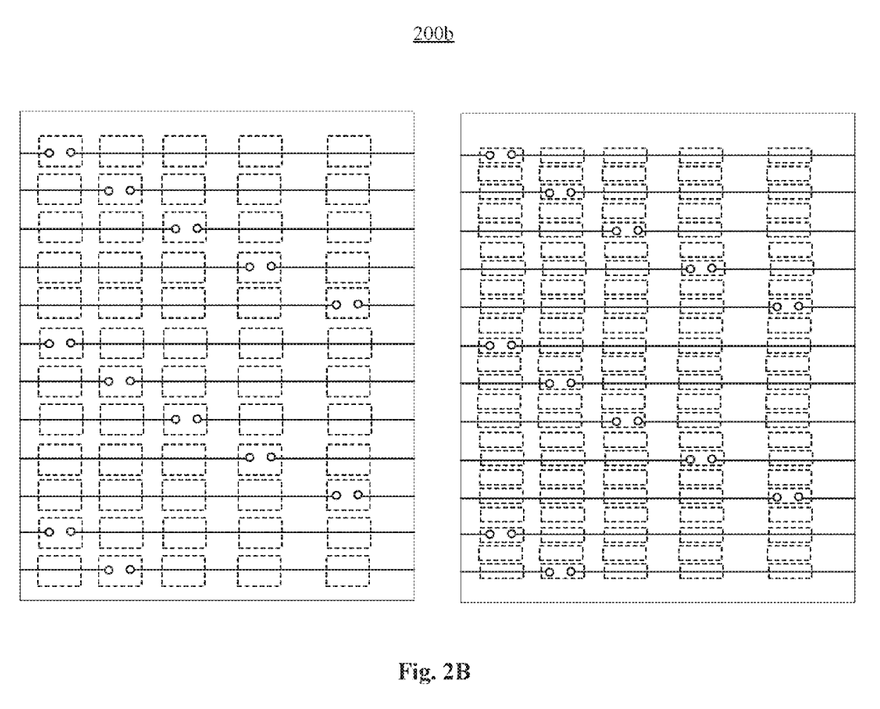
FIG. 2B is a schematic diagram illustrating a configuration of switch openings, according to an exemplary embodiment.

The n wires 124 can be divided into two or more groups, and for each group of wires 124, switch openings may be configured as staggered with each switch opening being at a different position in the horizontal direction, for example, evenly distributed at different positions horizontally. FIG. 2B is a schematic diagram illustrating a configuration 200b of switch openings, according to an exemplary embodiment. As shown in FIG. 2B, dashed rectangular boxes represent projected planes of spacers. In the left part of FIG. 2B, the two rows of spacers over adjacent wires 124 are adjacent to each other. In the right part of the FIG. 2B, the two rows of spacers over adjacent wires 124 are separated by a predetermined number of rows. In this example, the predetermined number of rows is set to be one row.

In other implementations, the array of spacers 125 may include j columns of spacers, the n wires 124 may be arranged inside the cavity in n columns, and each of the wires 124 may be disposed below one column of spacers, where j is a positive integer and j≥n. The two columns of spacers over two adjacent wires 124 may be adjacent to each other or separated by a predetermined number of columns. The predetermined number of columns may be the same or different for each pair of adjacent wires.

Figure 2C:
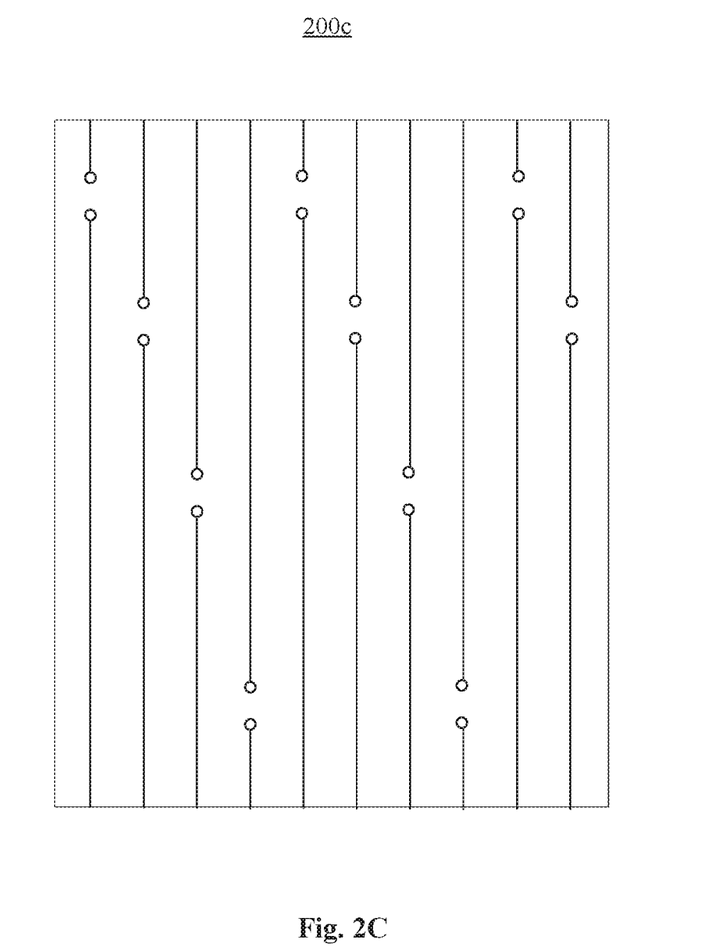
FIG. 2C is a schematic diagram illustrating a configuration of switch openings, according to an exemplary embodiment.

Similar to the wires arranged in rows discussed above, the n wires 124 may include two or more groups of wires 124. Where the n wires 124 are arranged in columns, for each group of wires 124, each switch opening may be staggered at a different position in the vertical direction. FIG. 2C is a schematic diagram illustrating a configuration 200c of switch openings. As shown in FIG. 2C, dashed rectangular boxes represent projected planes of spacers, and the two columns of spacers over adjacent wires 124 are adjacent columns.

In some implementations, the wires 124 may be metal wires. In other implementations, where the array of spacers 125 is coupled to the bottom surface of the upper substrate 122, the wires 124 may be implemented as rows or columns of conductive pattern on the top surface of the lower substrate 121. Where the array of spacers 125 is coupled to the top surface of the lower substrate 121, the wires 124 may be implemented as rows or columns of conductive pattern on the bottom surface of the upper substrate 122.

Figure 2D:
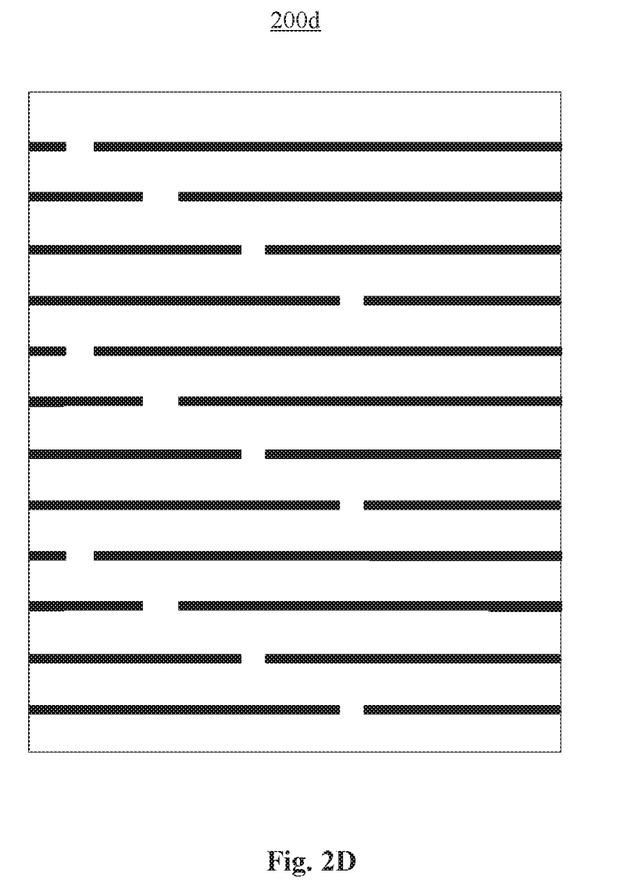
FIG. 2D is a schematic diagram wires, according to an exemplary embodiment.

The conductive pattern may be a pattern etched on the upper substrate 122 or the lower substrate 121. The configuration of the conductive pattern is not intended to be limited by the present disclosure. FIG. 2D is a schematic diagram 200d of the wires. In this example, the array of spacers 125 is coupled to the top surface of the lower substrate 121, the wires 124 are implemented as rows of conductive pattern on the bottom surface of the upper substrate 122, where the conductive pattern is a line.

Figure 3:
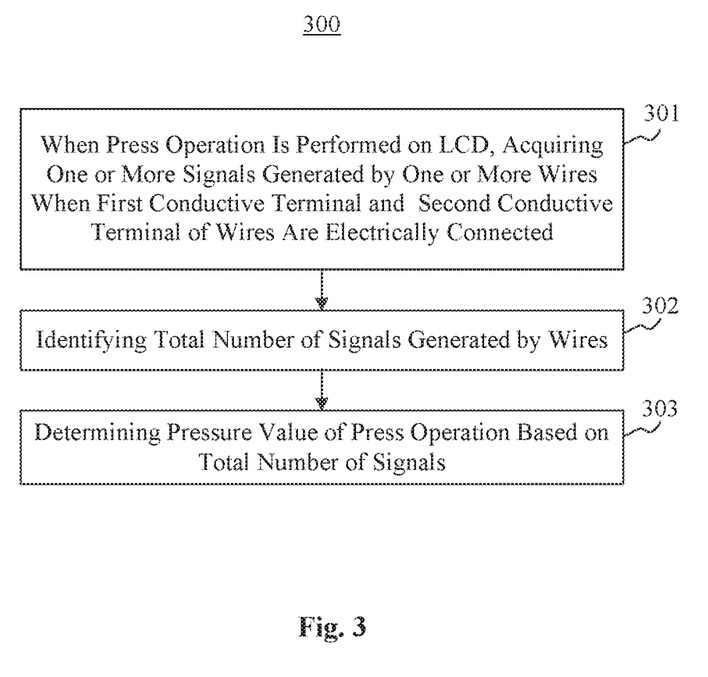
FIG. 3 is a flowchart, of a method for measuring an external pressure force at a LCD, according to an exemplary embodiment.

FIG. 3 is a flowchart of a method 300 for measuring an external pressure force at a LCD, according to an exemplary embodiment. The method 300 may be applied to the LCD 100 as shown in FIG. 1. The method 300 may be performed by the control unit 110 shown in FIG. 1. Referring to FIG. 3, the method 300 includes the following steps.

In step 301, when a press operation is performed on the LCD, the control unit acquires one or more signals generated by one or more wires when the first conductive terminal and second conductive terminal of each of the one or more wires are electrically connected.

In step 302, the control unit identifies a total number of the signals generated by the wires.

In step 303, the control unit determines a pressure value of the press operation based on the total number of the signals.

In the method 300, the pressure value of the external pressure force may be determined by the total number of the wires that are in the conductive state. In doing so, the LCD is not required to include a film for measuring the external pressure force, thereby simplifying the structure of the LCD.

Figure 4:
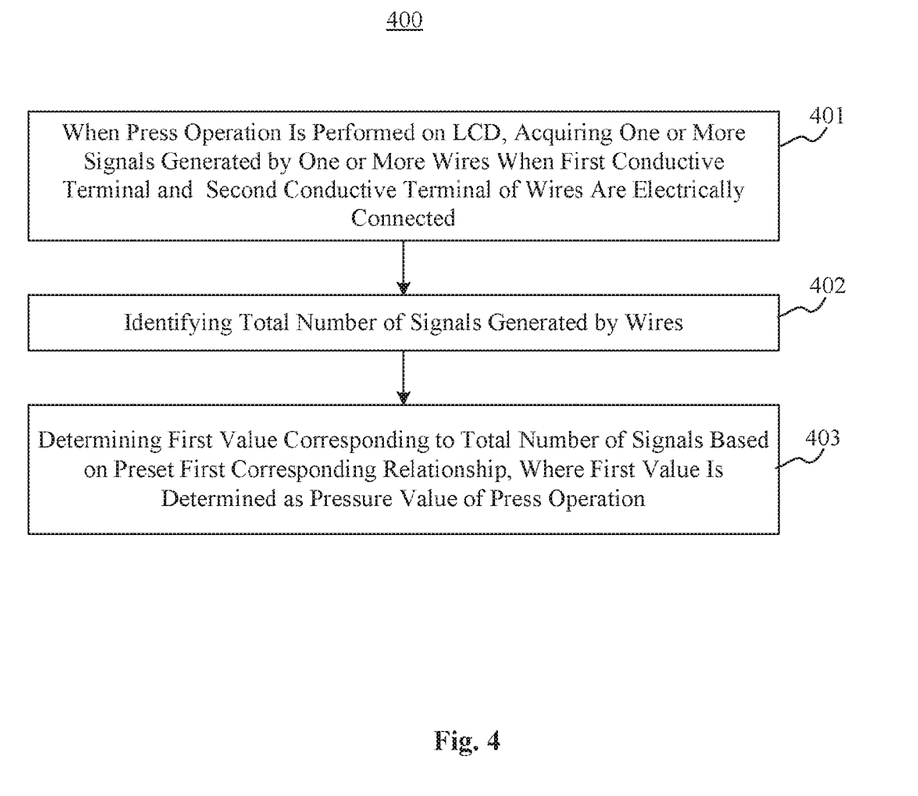
FIG. 4 is a flowchart of another method for measuring an external pressure force at a LCD, according to an exemplary embodiment.

FIG. 4 is a flowchart of a method 400 for measuring an external pressure force at a LCD, according to another exemplary embodiment. The method 400 may be applied to the LCD 100 as shown in FIG. 1. The method 400 may be performed by the control unit 110 shown in FIG. 1. Referring to FIG. 4, the method 400 includes the following steps.

In step 401, when a press operation is performed on the LCD, the control unit acquires one or more signals generated by one or more wires when the first conductive terminal and second conductive terminal of each of the one or more s are electrically connected.

When a user performs a press operation on the LCD, the upper substrate may be pressed down, such that the spacers may connect the first conductive terminals and the second conductive terminals of the wires. When the first conductive terminals and the second conductive terminals are electrically connected, signals will be generated by the wires. Thus, the control unit may acquire the signals generated by the wires.

In step 402, the control unit identifies a total number of the signals generated by the wires.

The greater the pressure force press operation performed by the user, the more the spacers may be pressed connecting the first conductive terminals and the second conductive terminals. Correspondingly, an increased number of wires may generate signals, and the pressure value of the press operation may be determined based on the total number of the signals generated by the wires.

In step 403, the control unit determines a first value corresponding to the total number of the signals based on a preset first corresponding relationship, where the first value is determined as the pressure value of the press operation.

The first corresponding relationship may be pre-set. The first corresponding relationship includes a corresponding relationship between a total number of signals and a pressure value. After the total number of the signals is identified, a corresponding pressure value may be determined based on the first corresponding relationship according to the total number of the signals. In the first corresponding relationship, one pressure value may correspond to one total number of the signals or a range of total numbers of the signals, which is not intended to be limited by the present disclosure.

In some embodiments, the control unit may calculate a density of the signals per unit area based on the total number of the signals, and determine a second value corresponding to the density based on a preset second corresponding relationship, where the second value is determined as the pressure value of the press operation. The second corresponding relationship may be pre-set. The second corresponding relationship includes a corresponding relationship between a density of signals and a pressure value. After the total number of the signals is identified, a density of the signals may be calculated according to the total number of the signals, and a corresponding pressure value may be determined based on the second corresponding relationship. In the second corresponding relationship, one pressure value may correspond to one density value or a range of density values, which is not intended to be limited by the present disclosure.

In some embodiments, calculating a density of the signals per unit based on the total number of the signals may include the following sub-steps. In the first sub-step, the control unit acquires positions of the signals. In the second sub-step, the control unit calculates an area of a region formed by all of the positions. In the third sub-step, the control unit divides the total number of the signals by the area, to obtain the density of the signals per unit area.

In some implementations, when the wires are installed, the control unit may store a position of each wire. The control unit may determine which wires generated signals, determine the positions of the signals based on the positions of the wires, and combine the positions of the signals to form a region of the press operations. Finally, the total number of the signals is divided by the area of the region, to obtain the density of the signals per unit area. The use of the density of the signal may improve the accuracy of the measured pressure value of the external pressure force.

Figure 5:
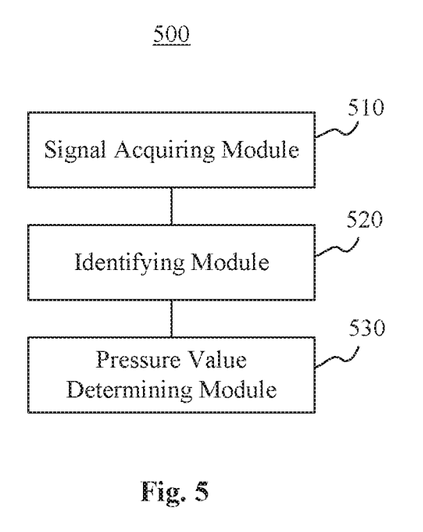
FIG. 5 is a block diagram of a device for measuring n external pressure force at a LCD, according to an exemplary embodiment.

FIG. 5 is a block diagram of a device 500 for measuring an external pressure force at a LCD, according to an exemplary embodiment. The device 500 may be implemented to measure the external pressure force at the LCD 100 shown in FIG. 1. Referring to FIG. 5, the device 500 includes a signal acquiring module 510, an identifying module 520, and a pressure value determining module 530.

The signal acquiring module 510 is configured to, when a press operation acted on the LCD is performed, acquire one or more signals generated by one or more wires when the first conductive terminal and second conductive terminal of each of the one or more wires are electrically connected.

The identifying module 520 is configured to identify a total number of the signals acquired by the signal-acquiring module 510.

The pressure value determining module 530 is configured to determine a pressure value of the press operation based on the total number of the signals identified by the identifying module 520.

Figure 6:
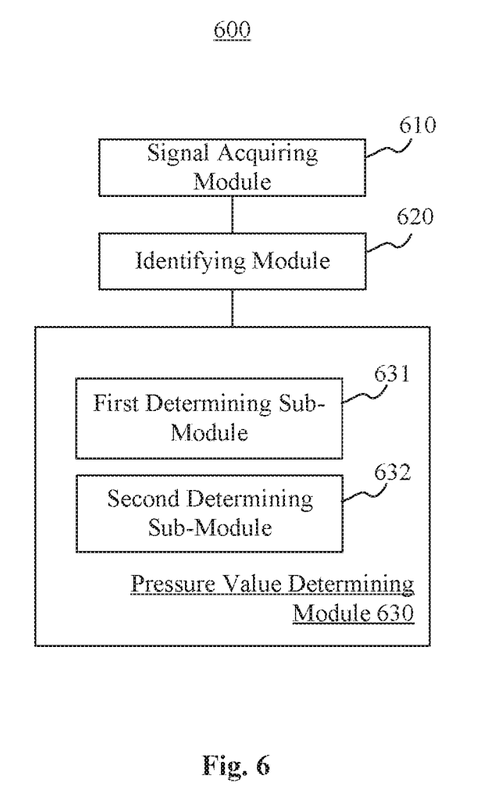
FIG. 6 is a block diagram of another device for measuring an external pressure force at a LCD, according to an exemplary embodiment.

FIG. 6 is a block diagram of a device 600 for measuring an external pressure force at a LCD, according to an exemplary embodiment. The device 600 may be implemented to measure the external pressure force at the LCD 100 shown in FIG. 1. Referring to FIG. 6, the device 600 includes a signal acquiring module 610, an identifying module 620, and a pressure value determining module 630.

The signal acquiring module 610 is configured to, when a press operation acted on the LCD is performed, acquire one or more signals generated by one or more wires when the first conductive terminal and second conductive terminal of each of the one or more wires are electrically connected.

The identifying module 620 is configured to identify a total number of the signals acquired by the signal acquiring module 610.

The pressure value determining module 630 is configured to determine a pressure value of the press operation based on the total number of the signals identified by the identifying module 620.

In some embodiments, the pressure value determining module 630 includes a first determining sub-module 631 or a second determining sub-module 632.

The first determining sub-module 631 is configured to determine a first value corresponding to the total number of the signals based on a preset first corresponding relationship, where the first value is determined as the pressure value of the press operation.

The second determining sub-module 632 is configured to calculate a density of the signals per unit area based on the total number of the signals, and determine a second value corresponding to the density based on a preset second corresponding relationship, where the second value is determined as the pressure value of the press operation.

Figure 7:
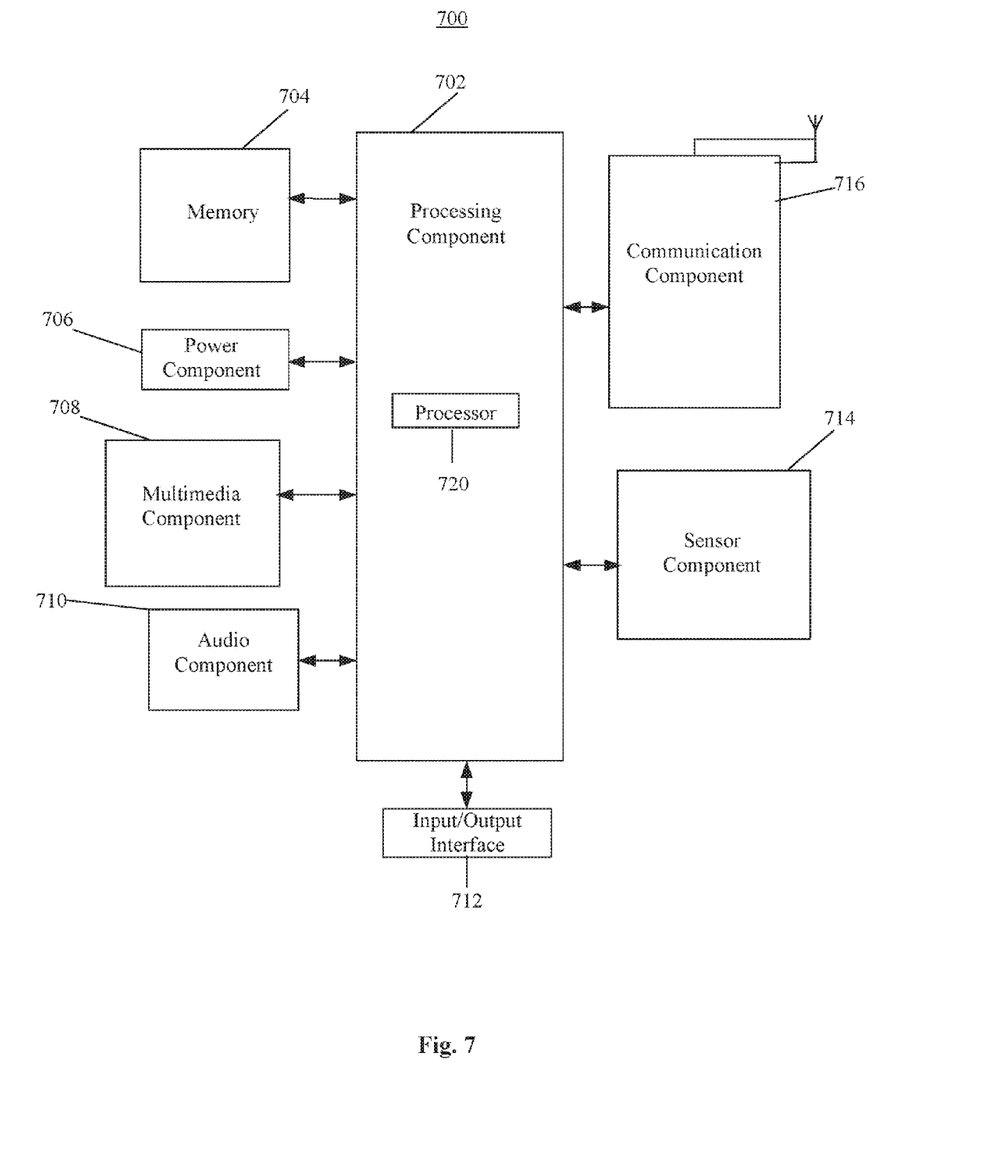
FIG. 7 is a block diagram of a terminal device, according to an exemplary embodiment.

FIG. 7 is a block diagram of a terminal device 700, according to an exemplary embodiment. For example, the terminal device 700 may be a device having a LCD, such as a mobile phone, a computer, a digital broadcast terminal, a messaging device, a gaming console, a tablet device, a medical device, exercise equipment, a personal digital assistant (PDA), and the like.

Referring to FIG. 7, the terminal device 700 may include one or more of the following components: a processing component 702, a memory 704, a power component 706, a multimedia component 708, an audio component 710, an input/output (I/O) interface 712, a sensor component 714, and a communication component 716. The person skilled in the art should appreciate that the structure of the terminal device 700 as shown in FIG. 7 does not intend to limit the terminal device 700. The terminal device 700 may include more or less components or combine some components or other different components.

The processing component 702 typically controls overall operations of the terminal device 700, such as the operations associated with display, telephone calls, data communications, camera operations, and recording operations. The processing component 702 may include one or processors 720 to execute instructions to perform all or part of the steps in the above described methods. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the terminal device 700. Examples of such data include instructions for any applications or methods operated on the terminal device 700, contact data, phonebook data, messages, images, video, etc. The memory 704 is also configured to store programs and modules. The processing component 702 performs various functions and data processing by operating programs and modules stored in the memory 704. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 is configured to provide power to various components of the terminal device 700. The power component 706 may include a power management system, one or more power sources, and any other components associated with the generation, management, and distribution of power terminal device 700.

The multimedia component 708 includes a LCD providing an output interface between the terminal device 700 and a user. In some embodiments, the LCD may include a display panel (LCD) and/or a touch panel (TP). If the LCD includes the touch panel, the LCD may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 708 includes a front camera and/or a rear camera. The front camera and the rear camera may receive an external multimedia datum while the terminal device 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone configured to receive an external audio signal when the terminal device 700 is in an operation mode, such as a call mode, a recording mode, and a voice recognition mode. The received audio signal may be further stored in the memory 704 or transmitted via the communication component 716. In some embodiments, the audio component 710 further includes a speaker to output audio signals.

The I/O interface 712 enface between the processing component 702 and peripheral interface modules, such as a keyboard, a click wheel, buttons, and the like. The buttons may include, but are not limited to, a home button, a volume button, a starting button, and a locking button.

The sensor component 714 includes one or more sensors to provide status assessments of various aspects of the terminal device 700. For instance, the sensor component 714 may detect an on/off state of the terminal device 700, relative positioning of components, e.g., the display and the keypad, of the terminal device 700, a change in position of the terminal device 700 or a component of the terminal device 700, a presence or absence of user contact with the terminal device 700, an orientation or an acceleration/deceleration of the terminal device 700, and a change in temperature of the terminal device 700. The sensor component 714 may include a proximity sensor configured to detect the presence of nearby objects without any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a pressure sensor, or a temperature sensor.

The communication component 716 is configured to facilitate communication, wired or wirelessly, between the terminal device 700 and other devices. The terminal device 700 can access a wireless network based on a communication standard, such as WiFi, 2G, or 3G, or a combination thereof. In one exemplary embodiment, the communication component 716 receives a broadcast signal or broadcast information from an external broadcast management system via a broadcast channel. In one exemplary embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal device 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 704, executable by the processor 720 in the terminal device 700, for performing the above-described methods. For example, the non-transitory computer-readable storage medium may be a ROM, a RAM, a CD-ROM, a magnetic tape, a floppy disc, an optical data storage device, and the like.

It should be understood by those skilled in the art that the above described modules can each be implemented through hardware, or software, or a combination of hardware and software. One of ordinary skill in the art will also understand that multiple ones of the above described modules may be combined as one module, and each of the above described modules may be further divided into a plurality of submodules.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof is intended that the scope of the invention only be limited by the appended claims.

What is claimed is:
1. A liquid crystal display (LCD), comprising: a display panel and a touch panel, each electrically connected to a control unit, a top surface of the display panel being adhered to a bottom surface of the touch panel, wherein the display panel comprises:
   a lower substrate;

an upper substrate disposed in parallel with the lower substrate;

a liquid crystal layer and n wires enclosed in a cavity defined by the upper substrate and the lower substrate, each of the n wires including a first conductive terminal, a second conductive terminal, and a switch opening configured to connect the first conductive terminal and the second conductive terminal, n being a positive integer, wherein a number of wires per unit area is greater than a predetermined threshold; and a plurality of protruding spacers disposed inside the cavity, the plurality of protruding spacers being coupled to at least one of a bottom surface of the upper substrate and a top surface of the lower substrate, wherein the switch opening of each of the n wires is configured to face one of the plurality of spacers, and the first conductive terminal and the second conductive terminal are electrically disconnected when a corresponding spacer is not pressed down, and the first conductive terminal and the second conductive terminal are electrically connected when the corresponding spacer is pressed down.

2. The LCD of claim 1, wherein the plurality of spacers comprises i rows of spacers, the n wires are configured to be inside the cavity in n rows, and each of the n wires is disposed below one of the i rows of spacers, i being a positive integer, and i≥n.

3. The LCD of claim 2, wherein the n wires comprise two or more groups of wires, and for each group of wires, the switch opening of each of the wires is configured to be at a different position in a horizontal direction.

4. The LCD of claim 2, wherein spacers over two adjacent wires are in adjacent rows or separated by a predetermined number of rows.

5. The LCD of claim 1, wherein the plurality of spacers comprises j columns of spacers, the n wires are configured to be inside the cavity in n columns, and each of the n wires is disposed below one of the j columns of spacers, j being a positive integer, and j≥n.

6. The LCD of claim 5, wherein the n wires comprise two or more groups of wires, and for each group of wires, the switch opening of each of the wires is configured to be at a different position in a vertical direction.

7. The LCD of claim 5, wherein spacers over two adjacent wires are in adjacent columns or separated by a predetermined number of columns.

8. The LCD of claim 1, wherein the plurality of spacers are made of conductive material, or bottom surfaces of the plurality of spacers are coated with the conductive material.

9. The LCD of claim 1, wherein the n wires include metal wires; or the plurality of spacers are coupled to the bottom surface of the upper substrate, and the n wires include rows or columns of conductive pattern on the top surface of the lower substrate; or the plurality of spacers are coupled to the top surface of the lower substrate, and the n wires include rows or columns of conductive pattern on the bottom surface of the upper substrate.

10. A method for measuring an external pressure force at the LCD of claim 1, the method comprising:

when a press operation is performed on the LCD, acquiring one or more signals generated by one or more wires of the n wires when the first conductive terminal and the second conductive terminal of each of the one or more wires are electrically connected;

identifying a total number of the signals; and determining a pressure value of the press operation based on the total number of the signals.

11. The method of claim 10, wherein determining a pressure value of the press operation based on the total number of the signals comprises:

determining a first value corresponding to the total number of the signals based on a preset corresponding relationship, and determining the first value as the pressure value of the press operation.

12. The method of claim 10, wherein determining a pressure value of the press operation based on the total number of the signals comprises:

calculating a density of the signals according to the total number of the signals; and determining a second value corresponding to the density of the signals based on a preset corresponding relationship, and determining the second value as the pressure value of the press operation.

13. The method of claim 12, wherein calculating a density of the signals based on the total number of the signals comprises acquiring a plurality of positions associated with the signals.

14. The method of claim 13, wherein calculating a density of the signals based on the total number of the signals further comprises:

calculating an area of a region formed by the plurality of positions; and dividing the total number of the signals by the calculated area to obtain the density of the signals.

15. A device, comprises:

the LCD of claim 1;

a processor; and a memory configured to storing instructions executable by the processor;

wherein the processor is configured to:

when a press operation is performed on the LCD, acquire one or more signals generated by one or more wires of the n wires when the first conductive terminal and second conductive terminal of each of the one or more wires are electrically connected;

identify a total number of the signals; and determine a pressure value of the press operation based on the total number of the signals.

16. The device of claim 15, wherein the processor is further configured to:

determine a first value corresponding to the total number of the signals based on a preset corresponding relationship, and determine the first value as the pressure value of the press operation.

17. The device of claim 15, wherein the processor is further configured to:

calculate a density of the signals according to the total number of the signals; and determine a second value corresponding to the density of the signals based on a preset corresponding relationship, and determine the second value as the pressure value of the press operation.

18. The device of claim 17, wherein the processor is further configured to acquire a plurality of positions associated with the one or more signals.

19. The device of claim 18, wherein the processor is further configured to:

calculate an area of a region formed by the plurality of positions; and divide the total number of the signals by the calculated area to obtain the density of the signals.

* * * * *